(12) United States Patent
Wagner

(10) Patent No.: US 10,607,101 B1
(45) Date of Patent: Mar. 31, 2020

(54) SYSTEM AND METHOD FOR PATTERNED ARTIFACT REMOVAL FOR BITONAL IMAGES

(71) Applicant: REVENUE MANAGEMENT SOLUTIONS, LLC, Oklahoma City, OK (US)

(72) Inventor: Jay Wagner, Yukon, OK (US)

(73) Assignee: Revenue Management Solutions, LLC, Oklahoma City, OK (US)

(*) Notice: Subject to any disclaimer, the term of this patent is extended or adjusted under 35 U.S.C. 154(b) by 38 days.

(21) Appl. No.: 15/839,133

(22) Filed: Dec. 12, 2017

Related U.S. Application Data

(60) Provisional application No. 62/434,208, filed on Dec. 14, 2016.

(51) Int. Cl.
*G06K 9/40* (2006.01)
*G06K 9/00* (2006.01)
*G06T 7/00* (2017.01)

(52) U.S. Cl.
CPC .......... *G06K 9/40* (2013.01); *G06K 9/00456* (2013.01); *G06T 7/0002* (2013.01); *G06K 2209/01* (2013.01)

(58) Field of Classification Search
CPC .. G06K 2209/01; G06K 9/033; G06K 9/2054; G06K 9/38; G06K 9/40; G06K 9/00456; G06T 7/0002; G06T 11/00; G06T 11/206; G06T 11/60; G09G 5/14
See application file for complete search history.

(56) References Cited

U.S. PATENT DOCUMENTS

| 6,023,534 | A | 2/2000 | Handley |
| 6,757,081 | B1* | 6/2004 | Fan ................... H04N 1/00002 358/2.1 |
| 7,454,060 | B2 | 11/2008 | Paik et al. |
| 8,373,724 | B2 | 2/2013 | Ratnakar et al. |
| 8,442,311 | B1* | 5/2013 | Hobbs ....................... G06T 9/00 382/166 |
| 9,251,614 | B1* | 2/2016 | Tian ..................... G06K 9/4604 |

(Continued)

OTHER PUBLICATIONS

"Document Analysis System", K.Y. Wong et al., IBM J. Res. Develop. vol. 26 No. 6 (Nov. 1982).

(Continued)

*Primary Examiner* — Bhavesh M Mehta
*Assistant Examiner* — Ian L Lemieux
(74) *Attorney, Agent, or Firm* — McAfee & Taft, A Professional Corporation

(57) ABSTRACT

Images in bitonal formats often include watermarks, stamps, or other patterns and artifacts. These patterned artifacts may be represented as a series of geometric points, dots, and/or dashes in the general shape of the original pattern. These patterned artifacts make other processes such as optical character recognition (OCR) difficult or impossible when items or pixels of interest are also found within the pattern of such artifact(s). Current patterned artifact removal solutions use methods of erosion to minimize the unwanted patterned artifact. However, such methods also erode the pixels/items of interest which, in turn, cause failures in other processes, such as OCR, that are desired to be carried out on or with the image.

19 Claims, 10 Drawing Sheets

(56) References Cited

U.S. PATENT DOCUMENTS

| | | | | |
|---|---|---|---|---|
| 2004/0042657 A1* | 3/2004 | Barton | G06K 9/2018 | 382/173 |
| 2004/0175037 A1* | 9/2004 | Guleryuz | G06K 9/00456 | 382/180 |
| 2007/0019881 A1* | 1/2007 | Curtis | H04N 1/4074 | 382/274 |
| 2007/0036435 A1* | 2/2007 | Bhattacharjya | G06K 9/38 | 382/180 |
| 2007/0189615 A1* | 8/2007 | Liu | G06K 9/38 | 382/232 |
| 2007/0253040 A1* | 11/2007 | Lee | G06K 9/38 | 358/518 |
| 2009/0119296 A1* | 5/2009 | Neogi | G06K 9/00442 | |
| 2010/0073735 A1* | 3/2010 | Hunt | G06T 3/0031 | 358/462 |
| 2013/0050764 A1* | 2/2013 | Zhan | H04N 1/403 | 358/2.1 |
| 2014/0193029 A1* | 7/2014 | Vassilieva | G06K 9/342 | 382/103 |

OTHER PUBLICATIONS

"Component-Based Handprint Segmentation Using Adaptive Writing Style Model", Michael D. Garris, National Institute of Standards and Technology (1997).

\* cited by examiner

SYSTEM AND METHOD FOR PATTERNED ARTIFACT REMOVAL FOR BITONAL IMAGES

CROSS-REFERENCE TO RELATED APPLICATIONS

This application claims priority from U.S. Provisional Patent Application Ser. No. 62/434,208, entitled PATTERNED ARTIFACT REMOVAL FOR BITONAL IMAGES, filed Dec. 14, 2016, the entire contents of which are incorporated herein by reference.

BACKGROUND

Images in bitonal formats often include watermarks, stamps, or other patterns and artifacts. These patterned artifacts may be represented as a series of geometric points, dots, and/or dashes in the general shape of the original pattern. These patterned artifacts make other processes such as optical character recognition (OCR) difficult or impossible when items or pixels of interest are also found within the pattern. Current patterned artifact removal solutions use methods of erosion to minimize the unwanted patterned artifact. However, such methods also erode the pixels/items of interest which, in turn, cause failures in other processes, such as OCR, that are desired to be carried out on or with the image.

SUMMARY

The present disclosure relates to a computer-implemented system and method for the removal of unwanted patterned artifacts that may overlap desired information or pixels/items of interest on a bitonal image and maintaining the integrity of the desired information or pixels/items of interest. Unwanted patterned artifacts might be added to a document prior to scanning, or are created when a document is scanned, or are otherwise present at the time the document is scanned.

A method for removing a patterned artifact from an initial bitonal image, the method being performed by one or more processors and comprising identifying the patterned artifact in the initial bitonal image, removing the patterned artifact to create a new bitonal image with the patterned artifact substantially removed; identifying text in the new bitonal image; and cleaning the new bitonal image to remove one or more remaining portions of the patterned artifact and thereby create a second new bitonal image.

A method for removing a patterned artifact from an initial bitonal image, the method being performed by one or more processors and comprising the steps of: (a) identifying the patterned artifact in the initial bitonal image. Wherein the identifying the patterned artifact step includes generating a modified image by applying an erosion algorithm based on stroke width of the initial image, and defining, in the modified image, an artifact boundary and thereby identify the patterned artifact. The method also includes step (b), removing the patterned artifact to create a new bitonal image with the patterned artifact substantially removed.

A method for removing a patterned artifact from an initial bitonal image, the method being performed by one or more processors and comprising: (a) identifying the patterned artifact in the initial bitonal image; (b) removing the patterned artifact to create a new bitonal image with the patterned artifact substantially removed, (c) identifying text in the new bitonal image, and (d) cleaning the new bitonal image to remove one or more remaining portions of the patterned artifact and thereby create a second new bitonal image. Wherein the identifying the patterned artifact step includes: (i) generating a modified image by applying an erosion algorithm based on stroke width of the initial image; (ii) marking noise locations of the modified image; and (iii) defining, in the modified image, an artifact boundary and thereby identify the patterned artifact. Wherein the removing the patterned artifact step includes: (i) applying one or more filters in the artifact boundary defined from the identifying the patterned artifact step; (ii) dilating the identified patterned artifact; and (iii) removing areas having a size larger than areas marked as noise from the marking step of the identifying the patterned artifact step and thereby creating the new bitonal image with the patterned artifact substantially removed. Wherein the step of identifying text in the new bitonal image includes: (i) identifying text in the new bitonal image; (ii) rank reducing the identified text to create one or more potential blocks of text; (iii) a first removing of one or more remaining portions of the patterned artifact through applying a binary AND operation on the identified text from the identifying text in the new bitonal image step with the one or more potential blocks of text from the rank reducing step to create a first intermediate bitonal image of the new bitonal image; (iv) dilating the first intermediate bitonal image; and (v) comparing the dilated first intermediate bitonal image with the initial bitonal image within the artifact boundary defined from the identifying the patterned artifact step thereby further removing the one or more remaining portion of the patterned artifact and creating a second intermediate bitonal image of the new bitonal image. Wherein the cleaning the new bitonal image step includes: cleaning the second intermediate bitonal image by applying a binary AND operation on the second intermediate bitonal image with the initial bitonal image within the artifact boundary defined from the identifying the patterned artifact step and thereby create the second new bitonal image.

A non-transitory computer-readable storage media having stored thereon a plurality of computer-executable instructions for removing a patterned artifact from an initial bitonal image which, when executed by a processor, cause the processor to: identify the patterned artifact in the initial bitonal image, wherein the identification of the patterned artifact in the bitonal image includes generating a modified image by applying an erosion algorithm based on stroke width of the initial image; and defining, in the modified image, an artifact boundary and thereby identify the patterned artifact, remove the patterned artifact to create a new bitonal image with the patterned artifact substantially removed, and clean the new bitonal image to remove one or more remaining portions of the patterned artifact and thereby create a second new bitonal image.

A system comprising: a processor; and a computer-readable storage media operably connected to said processor. The computer-readable storage media includes instructions that when executed by the processor, cause performance of the processor to remove a patterned artifact from an initial bitonal image by performing operations including: identify the patterned artifact in said initial bitonal image; remove the patterned artifact to create a new bitonal image with the patterned artifact substantially removed; identify text in the new bitonal image; and clean the new bitonal image to remove one or more remaining portion of the patterned artifact and thereby create a second new bitonal image.

BRIEF DESCRIPTION OF THE DRAWINGS

FIG. 1B is an enlargement of a portion of FIG. 1a.

DETAILED DESCRIPTION

Figure 1B:
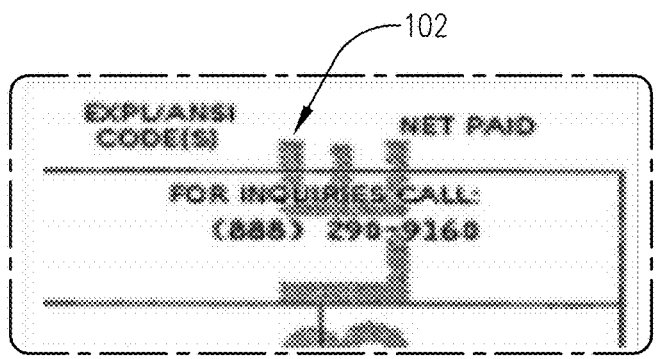
Figure 1A:
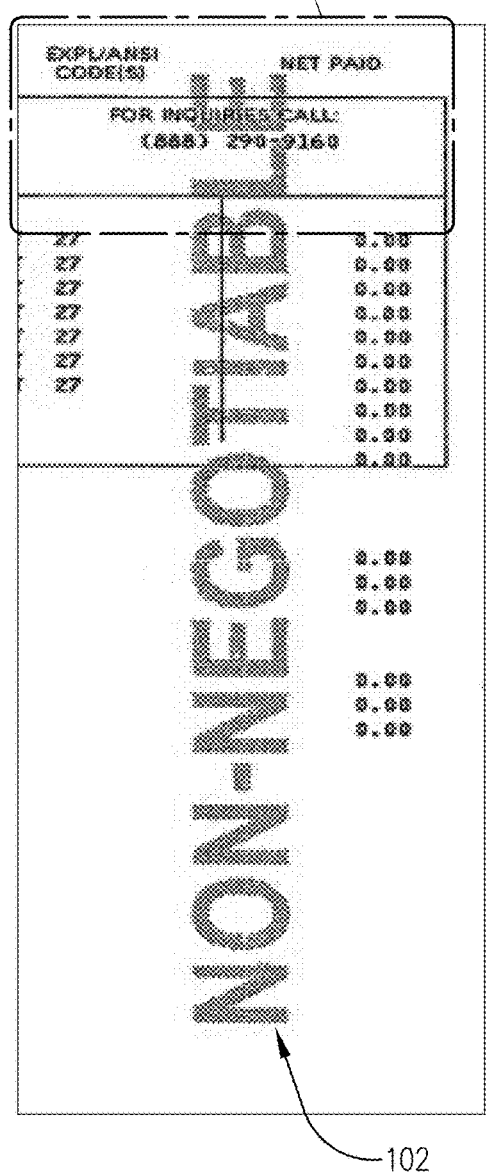
FIG. 1A illustrates a portion of a bitonal image containing an unwanted patterned artifact in the form of a watermark text reading "Non-negotiable" overlapping certain items of interest.
Figure 3A:
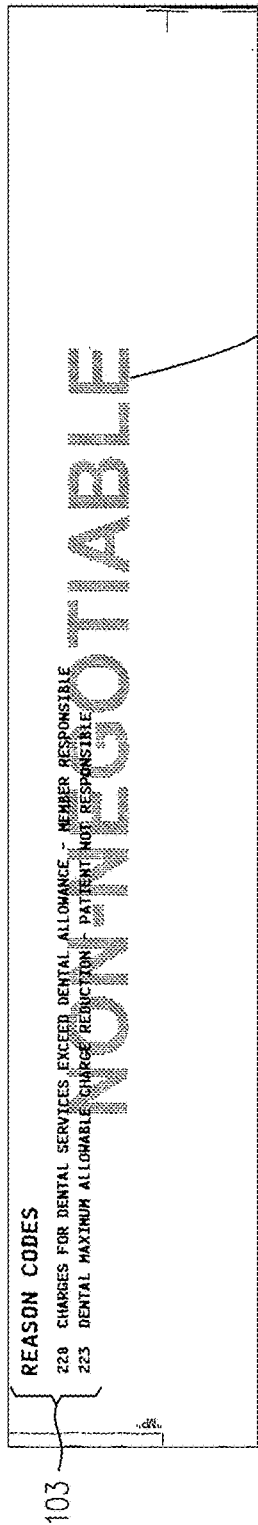
FIGS. 3A-3P show a simplified visual depiction of a method for removing a patterned artifact from a bitonal image.

The system and method described herein focus on removing unwanted patterned artifacts 102 found on bitonal images 100. The unwanted patterned artifacts 102 may have been added to a document post-print and prior to scanning, or may have been created when a document is scanned, or are otherwise present at the time the document is scanned. The unwanted patterned artifacts 102 may generally be present in a bitonal image 100 as a plurality of unconnected dots or dashes. For example, the text "NON-NEGOTIABLE" depicted in FIG. 1A, FIG. 1B (a portion thereof), and FIG. 3A is an example of a patterned artifact 102 overlapping other items, e.g. items of interest or desired information 103, on the bitonal image 100.

Figure 2:
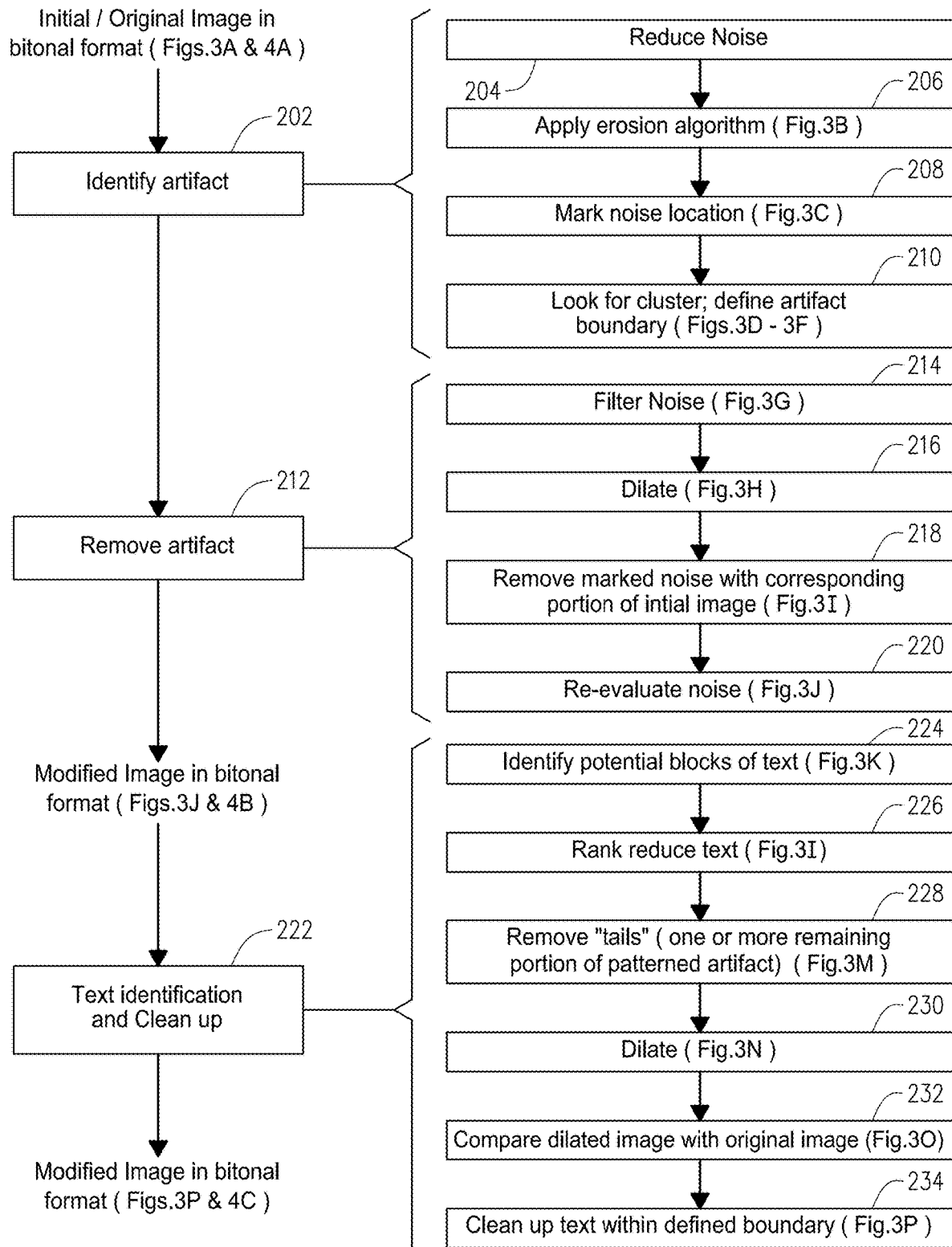
FIG. 2 is a simplified flowchart of a method for removing a patterned artifact from a bitonal image.
Figure 4A:
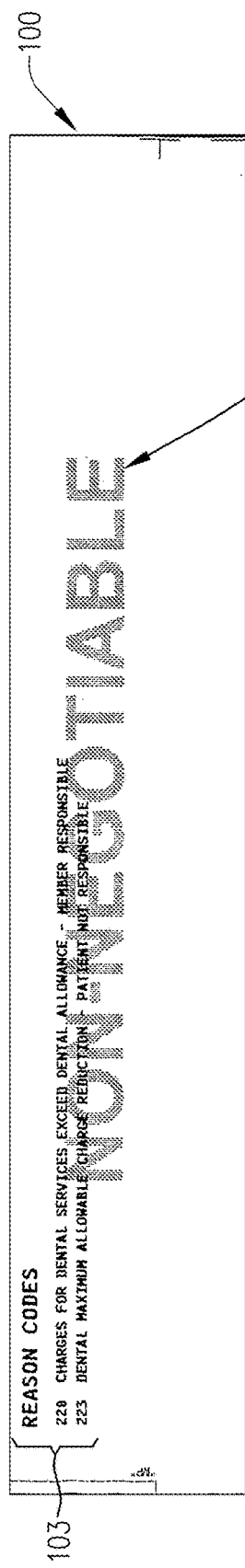
FIG. 4A is a reproduced image of the initial image depicted in FIG. 3A.

A simplified block diagram of a computer-implemented method for removing a patterned artifact from a bitonal image is depicted in FIG. 2. The described method and techniques can be performed using one or more computing systems 500 as will be described further. In FIG. 2 an initial or original image 100 in bitonal format is provided, e.g. scanned into or otherwise provided to a computing device 502 in a computing system 500. An example initial image 100 in bitonal format having one or more patterned artifacts 102 is depicted in FIGS. 3A and 4A.

Referring to FIG. 2, a computer-implemented method includes step 202 of identifying a patterned artifact 102 in an initial bitonal image 100. The identifying step 202 includes using noise and dot detection processes. Connected component analysis is conducted followed by applying one or more different filters. For example, the one or more different filters include a dot filter, a general noise filter, and a dash filter. For example, *NISTIR* 5843, *Component-Based Handprint Segmentation Using Adaptive Writing Style Model*, Michael D. Garris, National Institute of Standards and Technology, 1996, the entirety of which is incorporated by reference, describes different filters. For example, the noise, dot, and dash filters of Garris include, the noise filter at page 22, A.1; the dot filter at page 22 A.2; and the dash filter at page 24, A.7 regarding "dash-like" component, each of which are reproduced below in Table 1.

TABLE 1

| | |
|---|---|
| A.1 Is Noise? | If (c.a < (0.5 × ssa)) then Noise |
| | where structure member (a) is the pixel area of the component (c) and ssa is the pixel area of a standard stroke width |
| A.2 Is Dot? | If (c.w < (2 × esw)) && (c.h < (3 × esw)) then Dot |
| | where structure member (w) is the pixel width of the component (c) and esw is the estimated stroke width. This allows a small diagonal stroke to be considered a dot. Handprinted dots are seldom square, but they are typically a small tick-mark |
| A.7 Is Top of 5? | If (top is shorter && not too far right && not too far left && not too far down && dash-like) then Top of 5 |
| | where the tests for top component candidate (t) with left neighbor component (n) are |
| | shorter: (t.h < n.h) |
| | too far right: ((t.x1 − t.x2) < min((t.w × 0.5), (n.w × 0.5))) |
| | too far left: ((n.x1 − t.x1) < min((t.w × 0.5), (n.w × 0.5))) |
| | too far down: ((t. y2 − n.y1) < (n.w × 0.5)) |
| | dash-like: ((t.p / esw) < (t.1 + esw)) |
| | and the structure member (p) is the black pixel count of the component and (1) is the diagonal length of the component. The top horizontal stroke of a 5 is frequently written so that it is detached from its body. This stroke is dash-like, meaning the component is comprised of a single horizontal stroke that spans the entire width of the image. The height of the stroke should be uniformly close to the estimated stroke width, so dividing the black pixel count in the component by the estimate stroke width should be very close to the diagonal length of the component (at least within a stroke width). |

Figure 3B:
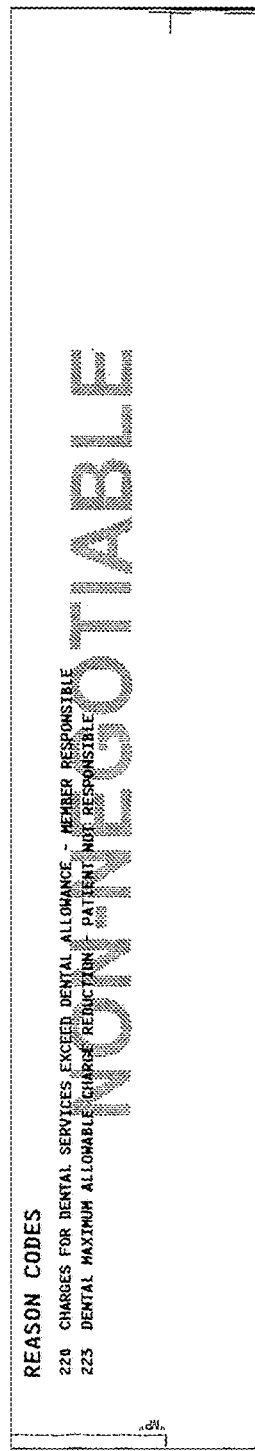

With reference to FIG. 2, the identifying step 202 includes, a step of reducing noise 204 by applying a noise reduction filter to the initial bitonal image 100. The identifying step 202 may further include at step 206, applying an erosion algorithm based on stroke width of the image to create a series of isolated dots to aid in identifying noise locations. For example, a binary morphology erosion algorithm may be used. The resultant visual image from applying the erosion algorithm in step 206 is illustrated in FIG. 3B. The resulting image depicted in FIG. 3B is a rectangle structure element with dimensions of half estimated stroke width for horizontal and three-quarters estimated stroke width for vertical direction.

The process for determining the stroke width is explained in NISTIR 5843, *Component-Based Handprint Segmentation Using Adaptive Writing Style Model*, Michael D. Garris, National Institute of Standards and Technology, 1996, the entirety of which is incorporated by reference. The formulation of the stroke width is found on page 5 in the first paragraph of section three of Garris. It is defined as "the median horizontal run length in the image."

Figure 3C:
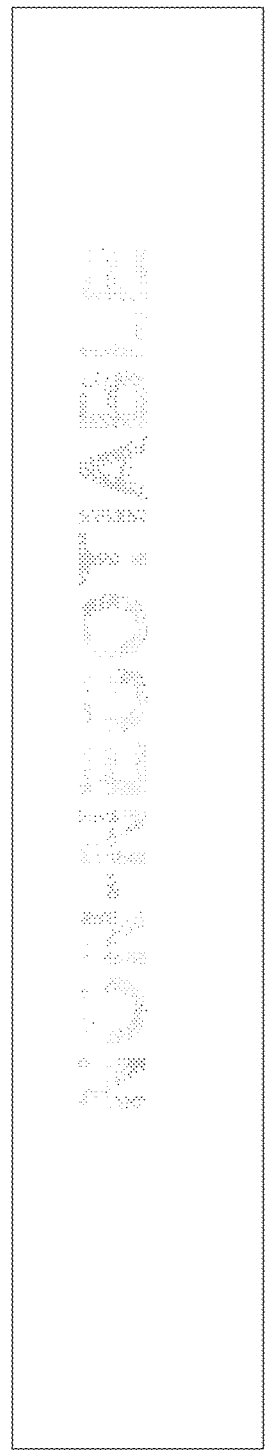
Figure 3D:
Figure 3E:
Figure 3F:
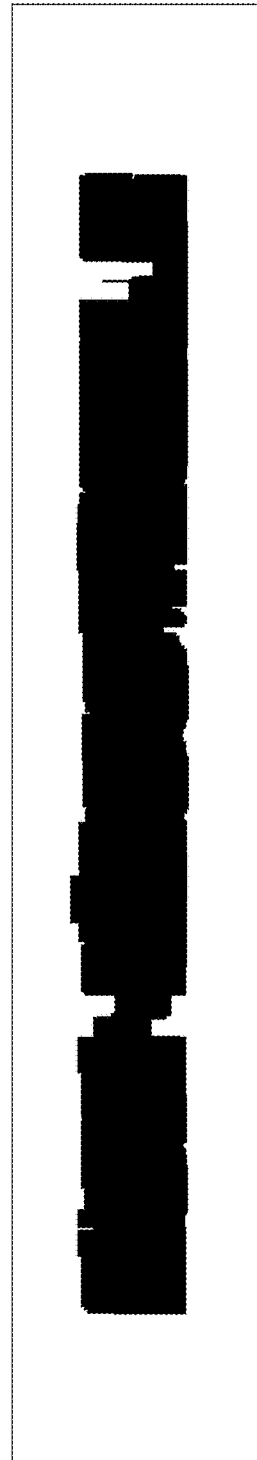

The method proceeds to step 208 to mark the noise locations within the structuring element found from step 206. The marked noise locations of step 208 are illustrated in FIG. 3C using the noise filter described above; however, any other noise detection algorithms known in the art that provide for similar results described in the present disclosure are also suitable. The identifying step 202 further includes step 210 of detecting the boundary of the patterned artifact 102 or cluster via a windowed search. FIGS. 3D-3F depict a visual representation of step 210. An initial forward pass for boundary detection occurs. For ease of reference and for exemplary purposes only, the measurements provided throughout this disclosure assume a resolution of 300 dpi (dots per inch) both in the x- and y-directions. Other resolutions and measurements can be used for various resolutions. For example, the forward pass may include a windowed detection from top to bottom, left to right with a size of twenty-nine (29) pixels wide and tall. By way of example, each window location may be defined to must have a minimum of five (5) "noise" connected components contained within the window. For example, upon detection, a black square with dimensions of sixty-eight (68) pixels wide and tall centered on the found point is output. FIG. 3D is the visual representation of the result of the forward pass boundary detection in connection with the herein described example resolution and numerical values. Step 210 of detecting the boundary of patterned artifact 102 of the identifying step 202 further includes a reverse pass for boundary detection, the resulting visual output is depicted in FIG. 3E. The reverse pass is the same as the forward pass described herein except that the windowed operation proceeds from bottom to top, right to left. FIG. 3F is representative of the result of a binary "AND" operation on the output of the forward pass boundary detection of FIG. 3D with the reverse pass boundary detection of FIG. 3E, thereby defining the boundary of artifact 102. The dimensions of the windowed search and numerical value of the noise count of the "noise connected components" of the present disclosure are not limited to the numerical values disclosed but are provided for representative purposes only, other dimensions and numeral values may be used.

Once artifact area boundary is identified the system and method proceed to step 212 of removing the identified patterned artifact 102.

Figure 3G:
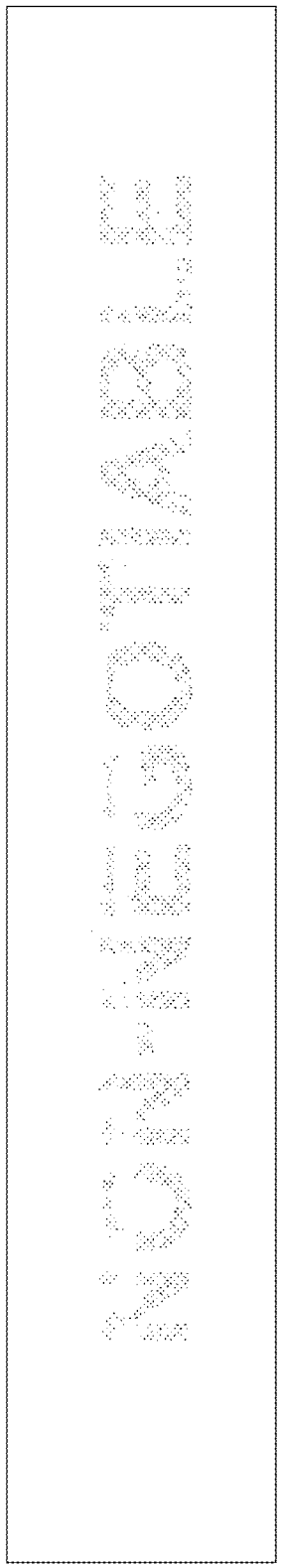
Figure 3H:
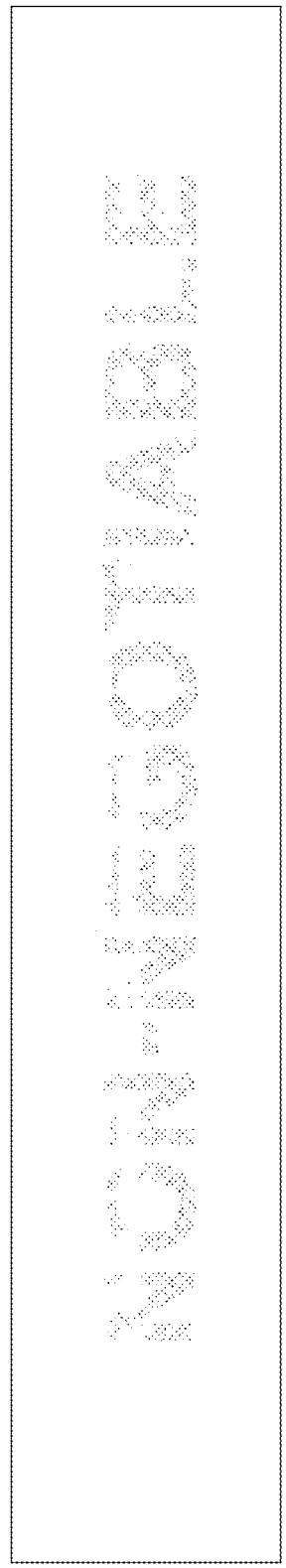

With reference to visual representation depicted in FIG. 3G, an intersection of all eroded information and the artifact area is identified for further processing. As shown in FIG. 3G, noise is filtered in step 214 through application of a noise filter. The noise identified in step 208 and visually depicted in FIG. 3C undergoes a binary "AND" operation to thereby limit the subsequent method steps to the area defined within the boundary obtained in step 210 (the boundary being visually depicted in FIG. 3F). The removal step 212 includes a dilating step 216, for example, binary morphology dilation may be used. FIG. 3H provides a visual example of the resultant patterned artifact 102 after undergoing the binary morphology dilation processing step of 216.

Figure 3I:
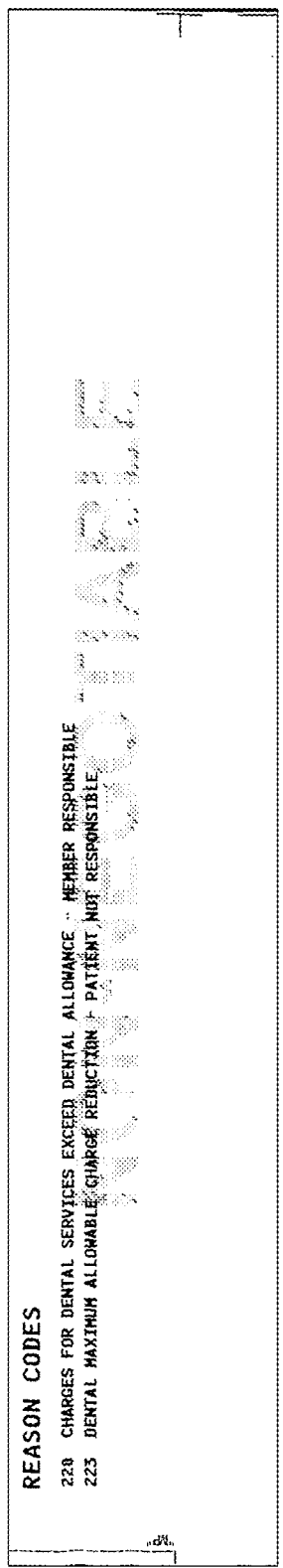

The removal step 212 further includes step 218 of applying noise filters to remove the patterned artifact 102 while leaving the desired information or items of interest 103, such as lines and character fields. For example, with reference to FIG. 3I, the removal step 212 proceeds to step 218 to remove the areas defined as noise from step 208 from the initial image 100 depicted in FIG. 3A. The areas defined as noise are removed using an area size of a few pixels larger than the size of the noise, e.g. two (2) pixels or any other suitable value that does not cause a significant loss of to the desired information 103.

Figure 3J:
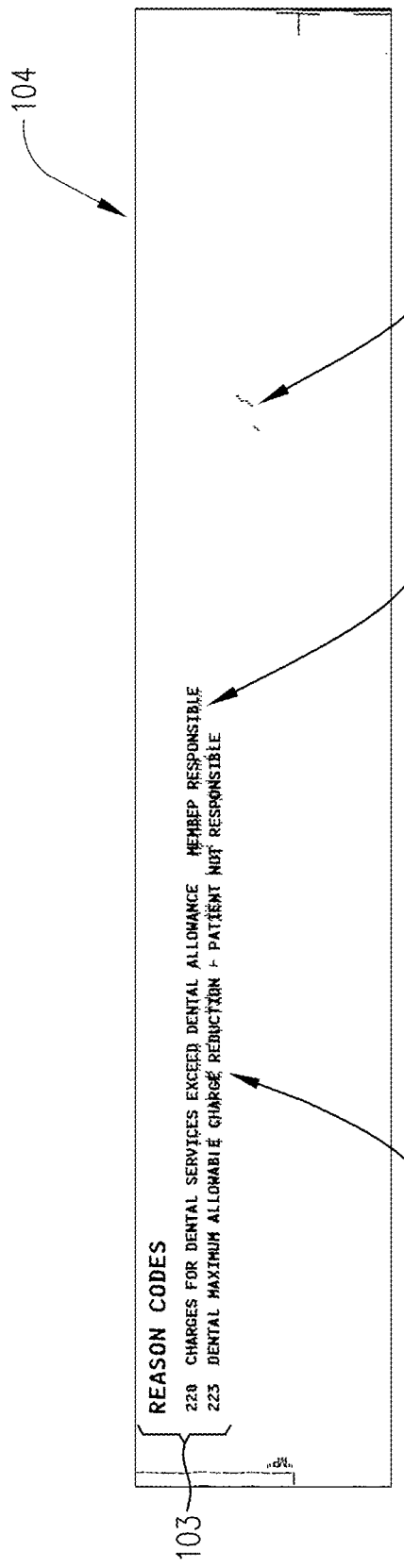
Figure 4B:
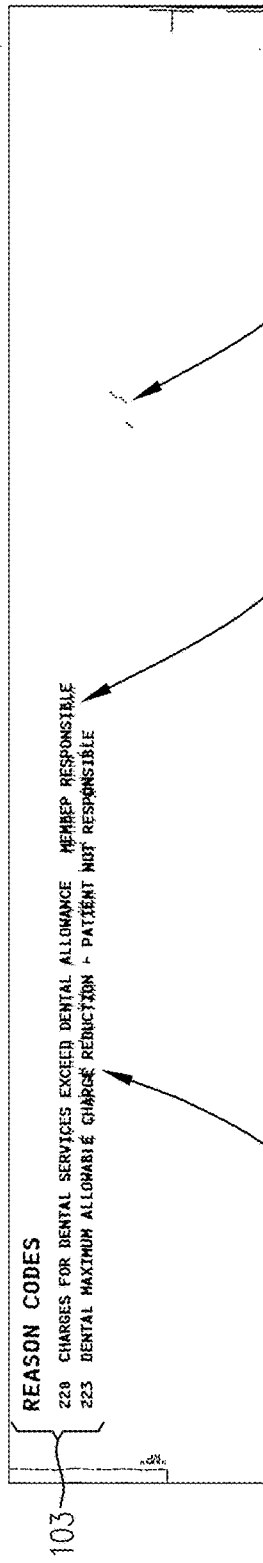
FIG. 4B is a reproduced image of the modified image of FIG. 3J with the artifact(s) removed.

The removal step 212 further includes step 220 of re-evaluating the noise. With reference to the visual depiction shown in FIG. 3J, noise with the characteristics of dot width of eight (8), dot height of twelve (12), and a noise threshold of eight (8) with a four-pixel boundary using a binary "AND" operation on the results of the previous operation, e.g. step 218 visually depicted in FIG. 3I with that of the original image 100 visually depicted in FIG. 3A. FIGS. 3J and 4B depict the resulting new bitonal image 104 with most or a substantial portion of the patterned artifact 102 removed.

With reference to FIG. 2, the system and method may optionally further include additional processing on the new bitonal image 104. For example, additional processing may include step 222 of text identification and clean-up of the image 104 to remove "hair" or "tails" or line trails 105 remaining within the defined boundary found earlier. An example of the remaining unwanted patterned artifact in the form of "hair" or "tails" 105 is shown in FIG. 3J in the word "charge".

To remove the remaining unwanted patterned artifacts 105, the image 104 of FIG. 3J may then be dilated slightly higher than what was previously done with reference to step 206, visually depicted as FIG. 3B. The dilated image may then be compared with the original bitonal image 100 depicted in FIG. 3A but only within the defined area or boundary that was found earlier.

Figure 3K:
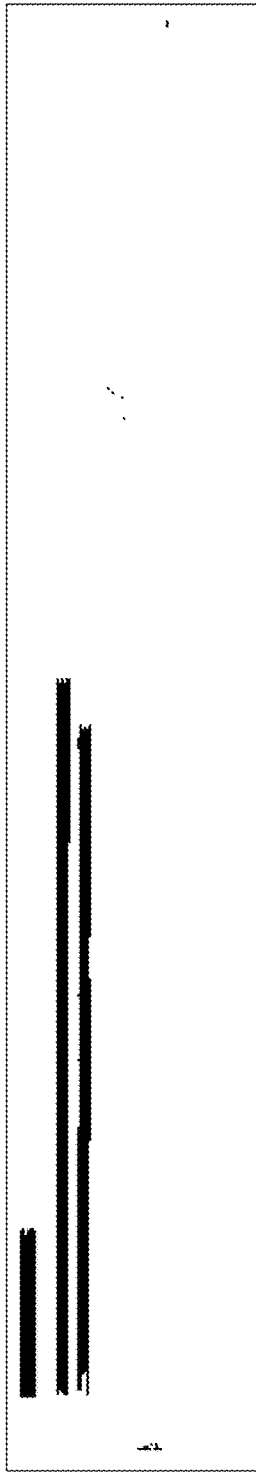

For example, with reference to the visual depiction at FIG. 3K, at step 224 the system and method proceeds to identify potential blocks of text, in this case the text of desired information or items of interest 103. Potential blocks are identified by any text segmentation algorithm, including a "smearing" methodology as described in Wong K., R. Casey, F. Wahl (1982), Document analysis systems, IBM Journal of research and development, Vol 26, no 6, the entirety of which is incorporated by reference. FIG. 3K illustrates the result of identifying potential blocks of text of the image of FIG. 3J.

Figure 3L:
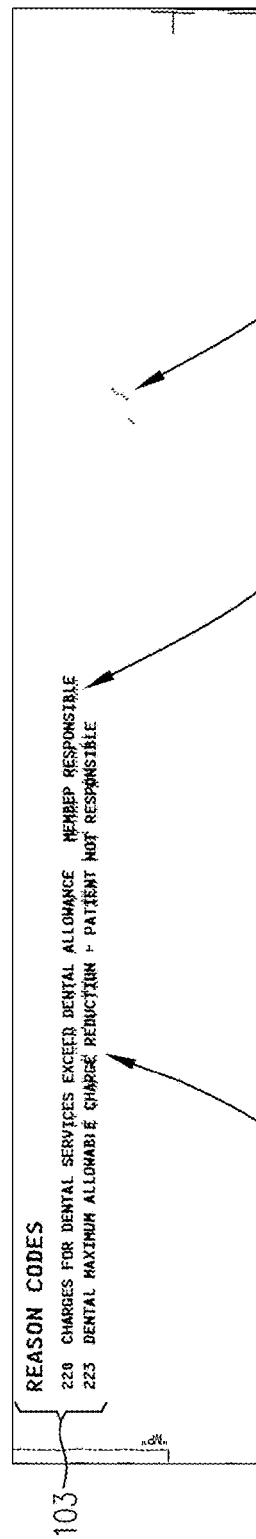

Step 222 may further include step 226, rank reducing the text as visually depicted in FIG. 3L. The text of FIG. 3J is rank reduced by four (4) thereby causing the text to become blocked which helps aid in removal of the one or more remaining portions 105 of the patterned artifact 102.

Figure 3M:
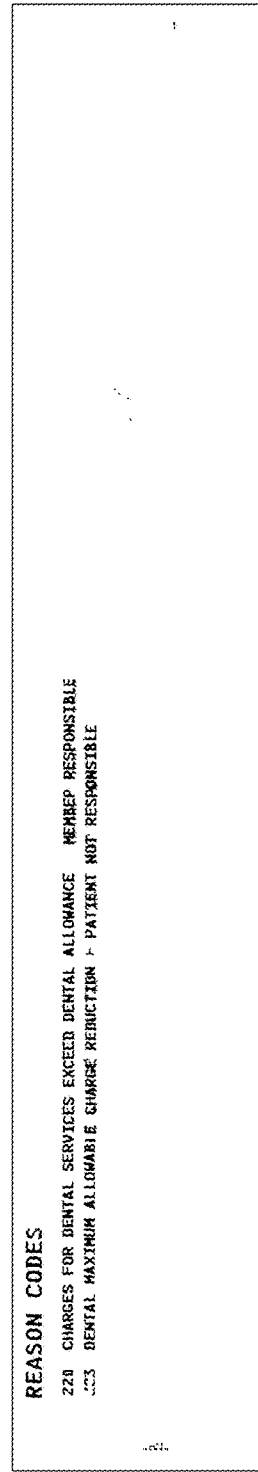

Step 228 of removing the one or more remaining portions 105 of artifact 102 of the text identification and clean up step 222 is visually depicted in FIG. 3M. FIG. 3M depicts the result of a binary "AND" operation of the text block of identified at step 224 of FIG. 3K with the rank reduced text of step 226 depicted in FIG. 3L, thereby removing one or more remaining portions 105 of artifact 102.

Figure 3N:
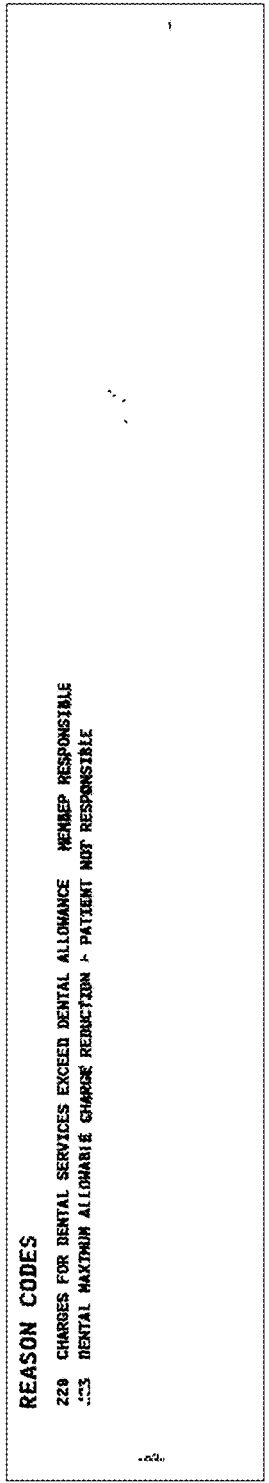

The text identification and clean up step 222 further includes a dilating step 230 by dilating the image depicted in FIG. 3M. For example, the image of FIG. 3M is dilated where the structuring element is a rectangle with dimensions of two pixels in both the horizontal and vertical directions. FIG. 3N is the resultant image of the dilating step 230 via binary morphology dilation.

Figure 3O:
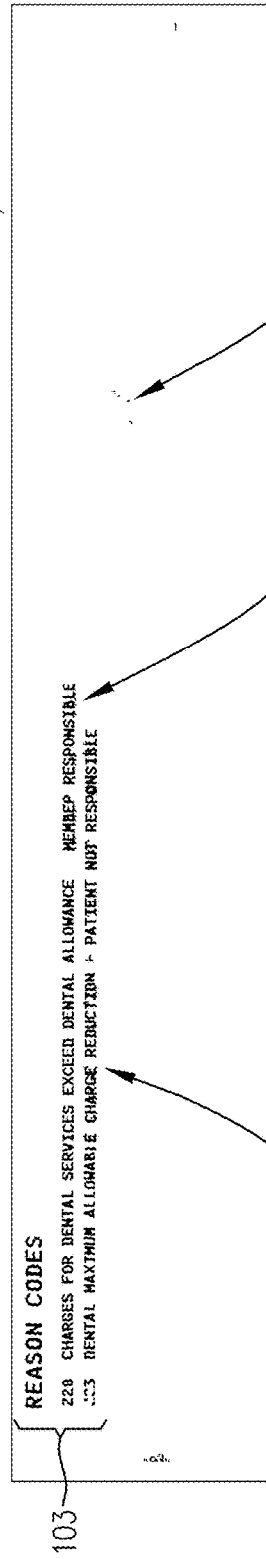

The text identification and clean up step 222 further includes removing the one or more remaining portions 105 of the patterned artifact 102 by utilizing a comparison step 232 by applying a binary "AND" operation of the dilated image depicted in FIG. 3N with the original image 100 depicted in FIG. 3A within the artifact boundary defined by the prior steps discussed above to produce the resultant image 106 shown in FIG. 3O.

Figure 3P:
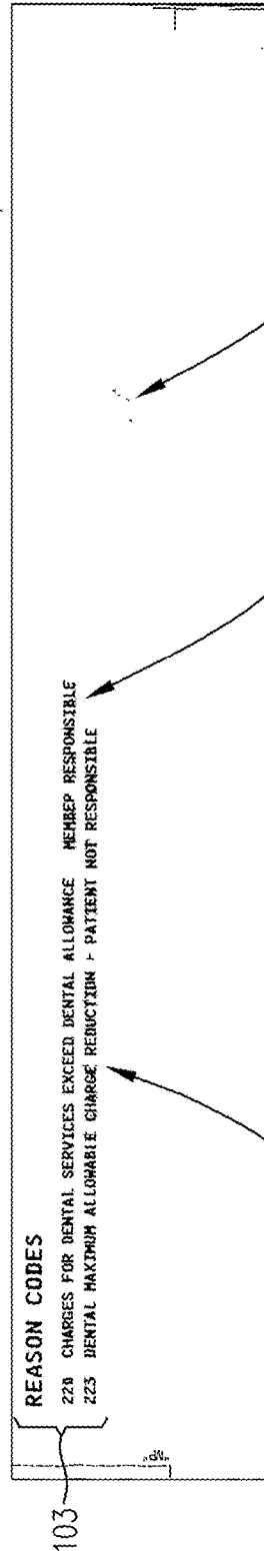
Figure 4C:
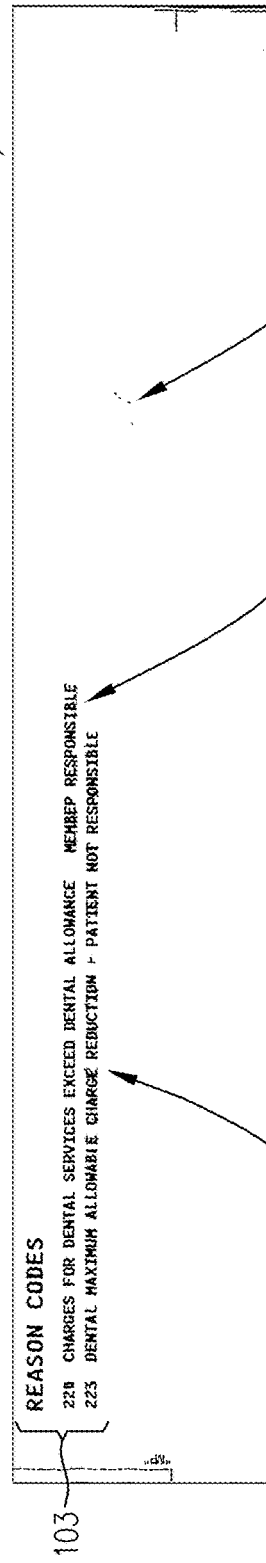
FIG. 4C is a reproduced image of the modified image of FIG. 3P after the optional clean up steps have occurred.

The text identification and clean up step 222 further includes step 234 of cleaning up image 106 to achieve a second new or second modified bitonal image 108 depicted in FIG. 3P and FIG. 4C. FIG. 3P is the result of performing a binary "AND" operation on image 106 depicted in FIG. 3O with the original image 100 depicted in FIG. 3A and only within the defined boundary which was previously found as described above with reference to FIG. 3F.

Table 2 shows an example of a sample of how the disclosed computer-implemented methods, systems, and techniques described herein increases accuracy of identifying patterned artifacts 102, removing the artifact 102, and maintaining the integrity of the items of interest 103 of a given bitonal image.

TABLE 2

| | | |
|---|---|---|
| Total Characters | 6,304 | |
| Total Original Misreads | 5,085 | 80.7% |
| Total Misreads AFTER Removal | 1,191 | 18.9% |
| Improvement | 3,894 | 61.8% |

As shown in Table 2, in the sample, 6,304 characters were reviewed. Approximately 80.7%, i.e. 5,085 characters, were misread when the computing systems and described methods and techniques for patterned artifact removal was not applied. When the described patterned artifact removal systems, techniques, and methodology was implemented on the same set of characters, only 1,191 characters or 18.9% resulted in a misread, thereby showing that the presently described systems, techniques, and methods result in an improvement for recognizing patterned artifact(s), removing the artifact(s), and maintaining the integrity of the items of interest of 61.8% or 3,894 characters of the given data set.

Figure 5:
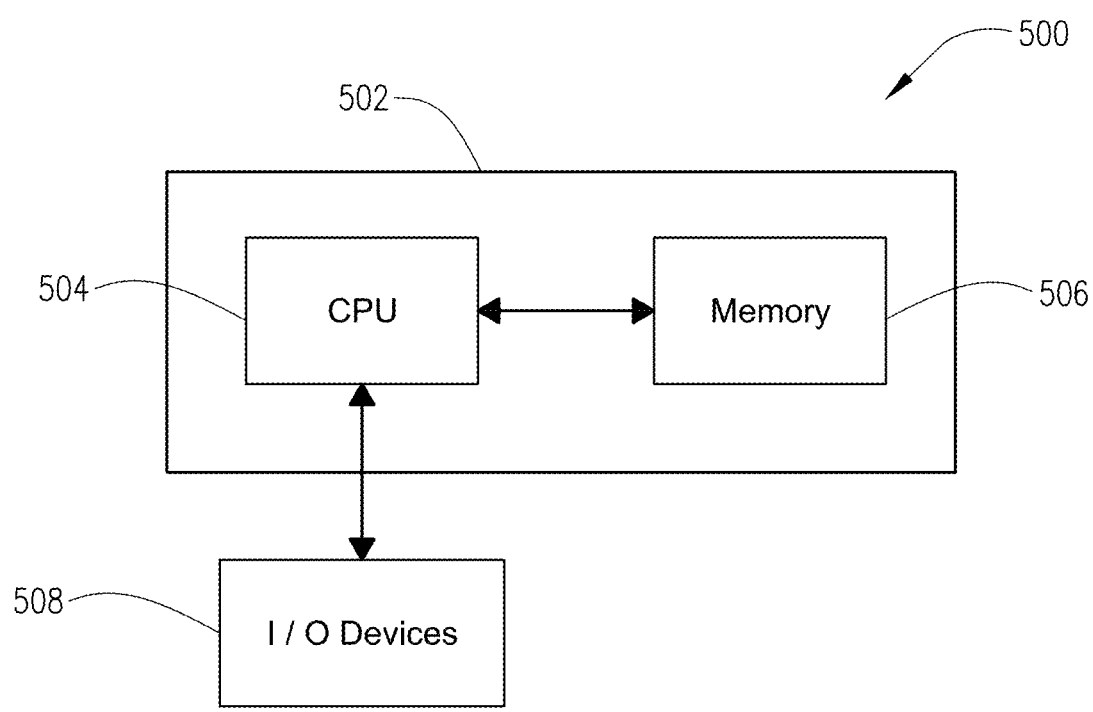
FIG. 5 is a simplified block diagram that shows an example of a computing system for removing unwanted patterned artifacts on a bitonal image.

FIG. 5 is a simplified block diagram for a computing system 500 suitable for implementing and performing the methods and techniques described herein. Computing system 500 includes a computing device 502 operably connected to one or more input/output (I/O) devices 508. Computing device 502 is representative of various forms of computing devices, including desktops, laptops, workstations, servers, mobile devices, such as personal digital assistants, tablets, smart-phones, cellular telephones, and other similar computing devices.

Computing device 502 includes a central processing unit (CPU) 504. CPU 504 includes one or more processors reading and/or executing instructions, programs, and applications stored in memory 506 and/or computer readable storage media of I/O devices 508, and accessing and/or storing data in memory 506 and/or computer readable storage media of I/O devices 508. CPU is operably connected with memory 506. CPU 504 is also operably connected with I/O devices 508 through an applicable interface component for the corresponding I/O device 508, e.g. port (serial, parallel USB), wire, card (sound, video, network), and the like. Exemplary types of CPU 504 may include general purpose processors, digital programmable devices, microcontrollers, digital signal processors (DSPs), application specific integrated circuit (ASIC), and field programmable gate array (FPGA), or other components and combinations thereof designed to perform the functions described herein.

Memory 506 includes data storage, volatile memory, e.g. random access memory (RAM), and non-volatile memory, e.g. read only memory (ROM).

I/O devices 508 include various devices that a user may use to interact with the computing device 502. Representative I/O devices 508 include keyboards, touchscreens, mouse and other pointing devices; a visual display device, such as a cathode ray tube, liquid crystal display, screens, and other suitable display devices for visually communicating and interacting with the user; audio devices, such as a microphone, headphones, speakers; and print devices for printing, scanning, faxing, and/or receiving and/or transmitting data and images. I/O devices 508 may also include computer readable storage media, e.g. mass storage devices, disks, magnetic disks, optical disks, magnetic tape, flash memory, RAM, ROM, EEPROM, or any other media that can be used to carry or store computer-readable information. I/O devices 508 may also include a communication device for connecting computing system 500 with one or more other computing systems over a network, e.g. wired and/or wirelessly, utilizing one or more communications protocols, e.g. IEEE 802.11, IEEE 802.3, TCP/IP, cellular protocols, any other communications protocols, and combinations thereof.

System 500 may include one or more I/O devices 508 of the same type or of different types and combinations thereof and one or more computing devices 502 of the same type or of different types and combinations thereof may be operably connected to each other and cooperating together to carry out the methods, functions, and techniques described herein.

The functions, methods, or algorithms described herein may be implemented in hardware, software, firmware, or any combinations thereof. When implemented in software, the described methods, functions, and techniques may be stored in memory, computer-readable storage media, and/or combinations thereof and transmitted as one or more instructions or code to cause CPU 504 to operate in accordance with the methods, functions, techniques, and teachings of the present disclosure. The operable connection of the various components of computing system 500 described in reference to FIG. 5 may include buses, circuitry, wires, wireless, or other similar connections. The functions, methods, and techniques described herein may be implemented by one or more computing system 500 in cooperation with each other. The components of system 500 shown and described, including their relationships and functions, are exemplary and are not to limit the implementation of the systems, methods, and techniques described herein.

As previously discussed above, the inclusion of certain numerical values for defining areas, dilation, rank reducing, etc. are for exemplary purposes only and the system, method, functions, and techniques described herein are not intended to be limited to those values. Adjustment of the numerical values are within the skills and knowledge of a person skilled in the art and the numerical values used may differ per application and use of the presently described system, method, functions, and techniques.

Although certain steps are described herein and illustrated in the figures as occurring sequentially, some steps may occur simultaneously with each other or in an order that is not depicted. The present disclosure of the disclosed system, methods, techniques, and functions are not to be limited to the precise descriptions and illustrations. Other embodiments will be apparent to one skilled in the art. As such, the foregoing description merely enables and describes the general uses of the described systems, methods, and techniques. While certain embodiments of the systems, methods, and techniques have been described for the purpose of this disclosure, those skilled in the art can make changes without departing from the spirit and scope thereof. Thus, the appended claims define what is claimed.

What is claimed is:

1. A method for removing a patterned artifact from an initial bitonal image, the method being performed by one or more processors and comprising:
   identifying the patterned artifact in the initial bitonal image,
      wherein the identifying the patterned artifact step includes:
         generating a modified image by applying an erosion algorithm based on stroke width of the initial image;
         marking noise locations of the modified image; and
         defining, in the modified image, an artifact boundary and thereby identify the patterned artifact;
   removing the patterned artifact to create a new bitonal image with the patterned artifact substantially removed; and
   identifying text in the new bitonal image; and
   cleaning the new bitonal image to remove one or more remaining portions of the patterned artifact and thereby create a second new bitonal image.

2. The method of claim 1, wherein the removing the patterned artifact step includes:
   applying one or more filters in the artifact boundary defined from the identifying the patterned artifact step;
   dilating the identified patterned artifact; and
   removing areas having a size larger than areas marked as noise from the marking step of the identifying the patterned artifact step and thereby creating the new bitonal image with the patterned artifact substantially removed.

3. The method of claim 2, wherein the step of identifying text in the new bitonal image includes:
   identifying text in the new bitonal image;
   rank reducing the identified text to create one or more potential blocks of text;
   a first removing of one or more remaining portions of the patterned artifact through applying a binary AND operation on the identified text from the identifying text in the new bitonal image step with the one or more potential blocks of text from the rank reducing step to create a first intermediate bitonal image of the new bitonal image;
   dilating the first intermediate bitonal image; and
   comparing the dilated first intermediate bitonal image with the initial bitonal image within the artifact boundary defined from the identifying the patterned artifact step thereby further removing the one or more remaining portion of the patterned artifact and creating a second intermediate bitonal image of the new bitonal image.

4. The method of claim 3, wherein the cleaning the new bitonal image step includes:
   cleaning the second intermediate bitonal image by applying a binary AND operation on the second intermediate bitonal image with the initial bitonal image within the artifact boundary defined from the identifying the patterned artifact step and thereby create the second new bitonal image.

5. A method for removing a patterned artifact from an initial bitonal image, the method being performed by one or more processors and comprising:
   (a) identifying the patterned artifact in the initial bitonal image, wherein the identifying the patterned artifact step includes:
      generating a modified image by applying an erosion algorithm based on stroke width of the initial image; and
      defining, in the modified image, an artifact boundary and thereby identify the patterned artifact; and
   (b) removing the patterned artifact to create a new bitonal image with the patterned artifact substantially removed.

6. The method of claim 5 further comprising the steps of:
   (c) identifying text in the new bitonal image; and
   (d) cleaning the new bitonal image to remove one or more remaining portions of the patterned artifact and thereby create a second new bitonal image.

7. The method of claim 6, wherein the step of identifying text in the new bitonal image includes:
   identifying text in the new bitonal image;
   rank reducing the identified text to create one or more potential blocks of text;
   a first removing of one or more remaining portions of the patterned artifact through applying a binary AND operation on the identified text from the identifying text in the new bitonal image step with the one or more potential blocks of text from the rank reducing step to create a first intermediate bitonal image of the new bitonal image;
   dilating the first intermediate bitonal image; and
   comparing the dilated first intermediate bitonal image with the initial bitonal image within the artifact boundary defined from the identifying the patterned artifact step thereby further removing the one or more remaining portion of the patterned artifact and creating a second intermediate bitonal image of the new bitonal image.

8. The method of claim 7, wherein the cleaning the new bitonal image step includes:
   cleaning the second intermediate bitonal image by applying a binary AND operation on the second intermediate bitonal image with the initial bitonal image within the artifact boundary defined from the identifying the patterned artifact step and thereby create the second new bitonal image.

9. The method of claim 5, wherein the identifying the patterned artifact step further includes:
   before defining the artifact boundary, marking noise locations of the modified image.

10. The method of claim 9, wherein the removing the patterned artifact step includes:
    applying one or more filters in the artifact boundary defined from the identifying the patterned artifact step;

dilating the identified patterned artifact; and
removing areas having a size larger than areas marked as noise from the marking step of the identifying the patterned artifact step and thereby creating the new bitonal image with the patterned artifact substantially removed.

11. A non-transitory computer-readable storage media having stored thereon a plurality of computer-executable instructions for removing a patterned artifact from an initial bitonal image which, when executed by a processor, cause the processor to:
identify the patterned artifact in the initial bitonal image, wherein the identification of the patterned artifact in the bitonal image includes generating a modified image by applying an erosion algorithm based on stroke width of the initial image; and defining, in the modified image, an artifact boundary and thereby identify the patterned artifact;
remove the patterned artifact to create a new bitonal image with the patterned artifact substantially removed; and
clean the new bitonal image to remove one or more remaining portions of the patterned artifact and thereby create a second new bitonal image.

12. The non-transitory computer-readable storage media of claim 11, wherein the plurality of computer-executable instructions for removing a patterned artifact from an initial bitonal image which, when executed by a processor, further cause the processor to:
prior to cleaning the new bitonal image, identify text in the new bitonal image.

13. The non-transitory computer-readable storage media of claim 12, wherein the identification of text in the new bitonal image includes:
identifying text in the new bitonal image;
rank reducing the identified text to create one or more potential blocks of text;
a first removing of one or more remaining portions of the patterned artifact through applying a binary AND operation on the identified text from the identifying text in the new bitonal image step with the one or more potential blocks of text from the rank reducing step to create a first intermediate bitonal image of the new bitonal image;
dilating the first intermediate bitonal image; and
comparing the dilated first intermediate bitonal image with the initial bitonal image within the artifact boundary defined from the identifying the patterned artifact step thereby further removing the one or more remaining portion of the patterned artifact and creating a second intermediate bitonal image of the new bitonal image.

14. The non-transitory computer-readable storage media of claim 13, wherein the cleaning the new bitonal image includes:
cleaning the second intermediate bitonal image by applying a binary AND operation on the second intermediate bitonal image with the initial bitonal image within the artifact boundary defined from the identifying the patterned artifact step and thereby create the second new bitonal image.

15. The non-transitory computer-readable storage media of claim 11, wherein the removal of the patterned artifact to create a new bitonal image with the patterned artifact substantially removed includes:
applying one or more filters in the artifact boundary;
dilating the identified patterned artifact; and
removing areas having a size larger than areas marked as noise from the marking step of the identifying the patterned artifact step and thereby creating the new bitonal image with the patterned artifact substantially removed.

16. A system comprising:
a processor; and
a computer-readable storage media operably connected to said processor, said computer-readable storage media including instructions that when executed by said processor, cause performance of said processor to remove a patterned artifact from an initial bitonal image by performing operations including:
identify the patterned artifact in said initial bitonal image,
wherein the operation of identify the patterned artifact in said initial bitonal image includes:
generating a modified image by applying an erosion algorithm based on stroke width of the initial image;
marking noise locations of the modified image; and
defining, in the modified image, an artifact boundary and thereby identify the patterned artifact;
remove the patterned artifact to create a new bitonal image with the patterned artifact substantially removed;
identify text in the new bitonal image; and
clean the new bitonal image to remove one or more remaining portion of the patterned artifact and thereby create a second new bitonal image.

17. The system of claim 16, wherein the operation of remove the patterned artifact to create a new bitonal image with the patterned artifact substantially removed includes:
applying one or more filters in the artifact boundary defined from the identifying the patterned artifact step;
dilating the identified patterned artifact; and
removing areas having a size larger than areas marked as noise from the marking step of the identifying the patterned artifact step and thereby creating the new bitonal image with the patterned artifact substantially removed.

18. The system of claim 16, wherein the operation of identify text in the new bitonal image includes:
identifying text in the new bitonal image;
rank reducing the identified text to create one or more potential blocks of text;
a first removing of one or more remaining portions of the patterned artifact through applying a binary AND operation on the identified text from the identifying text in the new bitonal image step with the one or more potential blocks of text from the rank reducing step to create a first intermediate bitonal image of the new bitonal image;
dilating the first intermediate bitonal image; and
comparing the dilated first intermediate bitonal image with the initial bitonal image within the artifact boundary defined from the identifying the patterned artifact step thereby further removing the one or more remaining portion of the patterned artifact and creating a second intermediate bitonal image of the new bitonal image.

19. The system of claim 18, wherein the operation of clean the new bitonal image to remove one or more remaining portion of the patterned artifact and thereby create a second new bitonal image includes:
cleaning the second intermediate bitonal image by applying a binary AND operation on the second intermediate bitonal image with the initial bitonal image within the artifact boundary defined from the identifying the patterned artifact step and thereby create the second new bitonal image.

* * * * *